United States Patent Office 3,288,771
Patented Nov. 29, 1966

3,288,771
PROCESS AND CATALYST FOR THE POLYMERIZATION OF ACRYLIC MONOMERS
James C. MacKenzie, Wellesley Hills, and Joel A. Yancey, Wellesley, Mass., assignors to Cabot Corporation, Boston, Mass., a corporation of Delaware
No Drawing. Filed Nov. 28, 1962, Ser. No. 240,725
17 Claims. (Cl. 260—88.7)

This case is a continuation in part of U.S. Serial No. 195,309, filed May 16, 1962, now abandoned and of U.S. Serial No. 86,868, filed February 3, 1961, now Patent No. 3,088,738, which in turn was a continuation in part of U.S. Serial No. 2,861, filed January 18, 1960, now abandoned.

This invention relates to the polymerization and copolymerization of acrylic monomers such as methyl methacrylate, isopropyl acrylate, acrylamide and acrylonitrile.

Accordingly, it is a principal object of the present invention to provide a novel process for polymerizing acrylic monomers and mixtures thereof.

Other objects of the present invention will in part be obvious and will in part appear hereinafter.

In accordance with the present invention, acrylic monomers are polymerized and/or copolymerized by catalysts comprising (a) the product of the reaction carried out under certain conditions between a halide-type compound of a metal of Group IVa, Va or VIa and a finely divided particulate inorganic solid having surface hydroxyl groups thereon, and (b) an organometallic compound. The polymerization or copolymerization reaction can be effected at suitable temperatures within the range of from about −80° C. to about 190° C., and pressures ranging from below atmospheric upwardly to any desired maximum pressure.

Inorganic solids suitable for the purposes of the present invention generally include any inorganic compound which is available in finely divided particulate form with hydroxyl groups on the surface thereof. For example, oxides such as alumina, zirconia, and silica, carbon blacks such as channel black and furnace black, and aluminates such as corundum are all generally suitable for the purposes of the present invention. Preferably, however, said inorganic solids must have an average particle diameter of less than about 0.1 micron and a substantial hydroxyl group concentration on the surface thereof.

Halide-type compounds of Groups IVa, Va and VIa (hereinafter generally referred to as transition metal halides) suitable for the purposes of the present invention are the compounds conforming to the general empirical formula:

$$TO_aX_b$$

wherein T is a metal of Group IVa, Va or VIa (where the group numbers correspond to the Mendeleev Periodic System); O is oxygen, $a$ is a number from 0 to 2; each X is any halogen; and $b$ is a number from 1 to 6.

Examples of suitable compounds conforming to said general formula are halides such as zirconium tetrachloride, vanadium tetrachloride, and titanium tetraiodide, and oxyhalides such as chromium oxychloride and vanadium oxychloride.

Preferred for imparting optimum catalytic activity and providing maximum catalyst efficiencies when used with a given organometallic compound in a given system are those inorganic solids which have from between about $1 \times 10^{-4}$ and about $5 \times 10^{-3}$ gram atoms of the transition metal chemically attached to the surface thereof per gram of said solid. The conditions under which reaction between the transition metal halide and the finely divided inorganic solid can be accomplished are subject to considerable variation. However, in order to obtain a catalyst component with exceptionally high activity and reproducible character and performance, it has been found to be all important that the finely divided inorganic solid be essentially dry and anhydrous (i.e. free of molecular water in any form) at the time it is brought into contact with the transition metal halide. In addition, it is recommended that the reaction of the inorganic solid and the transition metal halide be accomplished so as to allow gaseous by-products of the reaction to be eliminated from the reaction zone in order to thereby insure that said reaction goes to completion. Generally, the said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture and the rate of removal of the gaseous by-products. Generally speaking, almost any temperature between about 0° C. and 300° C. and even higher temperatures can be used satisfactorily, but room temperature to about 105° C. is generally preferred. Assuming provision is made for intimate contact of the dry inorganic solid and the transition metal halide, the minimum time required to accomplish the chemical reaction will vary from periods of the order of 1 hour (i.e. from about 0.5 hour to about 9 hours) at room temperature to periods of the order of minutes (i.e., from about 1 to about 45 minutes) at temperatures of 100° C. or over. Temperatures substantially higher than about 300° C., e.g., 500° C., are completely needless and therefore of little or no interest.

Elimination of by-products of the reaction from the reaction zone, i.e. from the reaction medium, can be accomplished in any convenient manner such as, by sweeping the reaction vessel with an inert gas, by carrying out the reaction at sufficiently elevated temperatures while stirring to drive off by-products, and by complexing or reacting said by-products with suitable substances such as tertiary amines, tertiary arsines, tertiary phosphines, terpenes, terpinenes, tetrasubstituted hydrazines, carbides such as calcium carbide, and other substances which will react or complex with said by-products and thereby eliminate them.

Organometallic compounds suitable for the purposes of the present invention are the compounds chosen from the group consisting of
(a) Compound conforming to the empirical formula $$MM'_vX_nR_{y-n}$$

wherein M is a metal chosen from Groups I, II and III of the periodic table; M' is a metal of Group I of the periodic table; $v$ is a number from 0 to 1; each X is any halogen; $n$ is a number from 0 to 3; each R is any monovalent hydrocarbon radical or hydrogen; $y$ is a number from 1 to 4; and wherein $y-n$ equals at least 1; and
(b) Compounds conforming to the empirical formula $$R'_pH_mSiO_{\frac{4-(m+p)}{2}}$$

wherein each R' is chosen from the group consisting of monovalent hydrocarbon radicals, monovalent alkoxy radicals, monovalent aryloxy radicals, and the halogens; $p$ is a number from 0 to 3; each H is a hydride radical; $m$ is a number from 1 to 4; Si is silicon; and O is oxygen.
Specific examples of R' groups for substitution in the above formula include methyl, 2-methyl-2-butenyl, n-dodecyl, 4-cyclohexylethyl, methylnaphthylethyl, 2,2,1 bicycloheptyl, tolyl, xylyl, xenyl, methoxy, isobutoxy, n-octyloxy, phenoxy and 1,2-naphthoxy.

Specific examples of compounds conforming to the formula $$\frac{R'_pH_mSiO_{4-(m+p)}}{2}$$

which are suitable for the purposes of the present invention are silane—$SiH_4$;
ethylsilane—$H_3SiC_2H_5$;
diethylmonochlorosilane—$HSiCl(C_2H_5)_2$;
dichlorosilane—$H_2SiCl_2$;
methyldiethylsilane—$HSi(C_2H_5)_2CH_3$;
trimethoxysilane—$HSi(OCH_3)_3$;
tribenzylsilane—$HSi(CH_2C_6H_5)_3$;
dicyclohexylphenylsilane—$HSiC_6H_5(C_6H_{11})_2$;
triphenoxysilane—$HSi(OC_6H_5)_3$;

cyclic alkyl hydrogen silicones such as $(CH_3HSiO)_6$; and linear alkyl hydrogen silicones such as $$(CH_3)_2HSiOSiH(CH_3)_2$$

Organometallic compounds which conform to the formula $$MM'_vX_nR_{y-n}$$

and which are suitable for the practice of the invention include compounds conforming to the subgeneric formula:

$$M(R)_k$$

wherein M is a Group I, II or III metal, such as sodium, beryllium, boron, aluminum and gallium; wherein $k$ is a number from 1 to 3 depending upon the valency of M; and wherein each R may be hydrogen or any monovalent hydrocarbon radical. Examples of suitable hydrocarbon radicals include aryl or alkaryl radicals, aliphatic hydrocarbon radicals, or derivatives, such as alkyl, cycloalkenylalkyl, arylalkyl, alkylcycloalkyl and cycloalkylalkenyl.

Specific examples of R groups for substitution in the above formula include methyl, isobutyl, hexyl, n-decyl, 2-methyl-2-butenyl, 4-cyclohexylethyl, 2 - phenylpropyl, methylnaphthylethyl, 2,2,1 - bicycloheptyl, dimethylcyclohexyl, 5-cyclopentadienyl, phenylcyclohexyl, tolyl, xylyl, xenyl, and dimethylnaphthyl.

Specific compounds conforming to the empirical formula $MM'_vX_nR_{y-n}$, and which are therefore suitable for the purposes of the present invention are organo compounds such as butyllithium, divinylmagnesium, di-p-tolylmercury, tri-n-amylboron, triisobutylaluminum, diisobutylaluminum bromide, phenylmercuric iodide, hexylcupric chloride, octylmagnesium hydride, triethyllithium aluminum bromide and sodiumdiphenyllithium. Definitely preferred, however, are the aluminum alkyls such as aluminum triisobutyl.

Further specific examples of suitable organometallic compounds conforming to the formula $$MM'_vX_nR_{y-n}$$

can be found in our copending U.S. application, Serial No. 2,861, filed January 18, 1960, now abandoned.

It is pointed out that catalyst formed with a silane require activation by heating to a temperature above about 100° C. and preferably above about 140° C. for at least about 1 hour. At higher temperatures, shorter periods of time are required. At substantially lower temperatures, the catalyst is either not formed at all or is of inferior quality.

Although it is appreciated that when R or R' in the above empirical formulae do not comprise at least one hydrocarbon radical, the resulting compounds cannot normally be termed organometallic compounds, compounds lacking at least one hydrocarbon radical comprise such a relatively small number of compounds included by said general formulae that for the purposes of the present invention, it is intended that these compounds be included within the generic term, organometallic compound. Accordingly, in the specification and in the claims, it is intended, and therefore, it should be understood, that the term, organometallic compound, refers to all the compounds included within the scope of the above defined general formulae. In addition, it is pointed out that while, strictly speaking, silicon is not a metal, it is intended, and therefore it should be understood, that for the purposes of the present specification and claims, silicon is a metal and the term organometallic includes within its scope, silicon compounds within the scope of the above formula, $$\frac{R'_pH_mSiO_{4-(m+p)}}{2}$$

Acrylic monomers suitable for the purposes of the present invention are those conforming to the formula:

$$H_2C=C-G$$
$$\phantom{H_2C=C-}|$$
$$\phantom{H_2C=C-}D$$

wherein D is chosen from the group consisting of any halogen, hydrogen, methyl, ethyl and propyl radicals, and G is a functional group chosen from the group consisting of carbalkoxy (—COOR) wherein the hydrocarbon radical has a length of one to eighteen carbon atoms; carbamoyl (—$CONH_2$); N - substituted carbamoyl (—CONHR, —$CONR_2$) wherein the hydrocarbon radicals have a length of one to eighteen carbon atoms; formyl (—CHO); cyano (C≡) and acyl (—COR) wherein the hydrocarbon radical has a length of one to eighteen carbon atoms. Examples of suitable monomers are N-methyl acrylamide, isopropyl acrylate, methyl methacrylate, acrylonitrile, arcolein, ethylacrylate, methyl vinyl ketone and methyl α-chloroacrylate.

Using the catalysts of this invention, polymerization of the acrylic monomers can be accomplished in the absence of liquids (other than the monomers themselves) solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also members of the aromatic hydrocarbon series, such as isopropyl benzene, ethyltoluene, hemimellitene, pseudocumene, isodurene, isoamylbenzene, and particularly the mononuclear aromatic hydrocarbons such as xylenes, mesitylene and xylene-p-cymene mixtures, and the like are completely suitable.

The proportion of surface reacted particulate inorganic solid to organometallic compound utilized in preparing the catalyst is not usually a critical feature of the process. We have found from experience that a molar ratio of from 0.1 to 5 millimoles of the organometallic compound per atom of transition metal chemically combined with the surface of the finely divided solid is to be preferred.

The quantity of catalyst, i.e. comprising both the surface reacted finely divided solid and the organometallic compound, to be utilized in the polymerization reaction may vary, but in general, the total quantity of catalyst that need be employed based on the weight of the charging stock is very small particularly when a very fine particle size oxide is utilized as the inorganic solid.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired results.

There follow a number of illustrative non-limiting examples:

Example 1

To a 1000 milliliter, three neck, glass reaction vessel there is added 10 grams of "Cab-O-Sil," a pyrogenic silica produced by Cabot Corporation, which has an average particle diameter of 20 millimicrons and a hydroxyl group content on the surface thereof of about 1.5 milliequivalents per gram. Said reaction vessel is then placed in a vacuum drying oven heated to a temperature of about 100° C. for about twelve hours. Subsequently, the vessel is sealed without exposing silica to the atmosphere and there are charged to said vessel 10 millimoles of vanadium tetrachloride and 500 milliliters of isooctane. The vessel is then continuously stirred, and maintained at a temperature of about 105° C. for a period of 4 hours. Subsequently, the extent of the reaction between the vanadium tetrachloride and the silica is determined by measuring the quantity of HCl removed from the vessel by the nitrogen stream, and by testing the liquid contents of the vessel for the absence therein of vanadium tetrachloride and the said silica is found to have 10 milliatoms of vanadium on the surface thereof. 50 milliliters of this slurry containing about 1 milliatom of vanadium bound to the surface of about 1 gram of silica, is then transferred from this reaction vessel to an 8 oz. bottle which has been previously flushed with dry nitrogen. Next, 3 millimoles of lithium butyl is added to the bottle followed by 1 millimole of tetrahydrofuran and 200 millimoles of isopropyl acrylate monomer. The bottle is then continuously agitated at ambient temperatures for about 24 hours. The reaction products are analyzed and it is found that about 10 grams of solid isopropyl acrylate polymer has been produced.

Example 2

To a 1000 milliliter, reaction vessel, there is added about 450 milliliters of the catalyst slurry produced in Example 1 which contains about 9 grams of silica. Next, 450 millimoles of methyl methacrylate monomer followed by 9 millimoles of triisobutylaluminum are added to the vessel. The vessel is then continuously agitated at ambient temperatures for 24 hours. The reaction products are analyzed and it is found that about 15.5 grams of solid methyl-methacrylate polymer has been produced. When under the same conditions, the triisobutylaluminum is utilized alone as the catalyst, i.e. in the absence of the cocatalyst, methyl methacrylate polymer is produced but the molecular weight of the polymer is much lower than the polymer produced in the presence of a catalyst comprising both components.

Example 3

To a 1000 milliliter, reaction vessel which has been previously flushed with dry nitrogen, there is added 9 millimoles of vanadium tetrachloride, 9 millimoles of triisobutylaluminum, 1 millimole of tetrahydrofuran and 450 millimoles of methyl methacrylate monomer. The vessel is then continuously agitated at ambient temperatures for 24 hours. The reaction products are analyzed and it is found that about 7 grams of methyl methacrylate polymer has been produced. The polymer product of this example, however, has a relatively very low molecular weight as compared to the polymer product of Example 2, above.

Example 4

To a 500 milliliter, three neck, glass reaction vessel there is added 5.3 grams of "Alon," a pyrogenic alumina produced by Deutsche Gold-Und Silber-Scheideanstalt Vormals Roessler and which has an average particle diameter of about 10–40 millimicrons and a hydroxyl group content on the surface thereof of about 0.7 milliequivalents per gram. Said reaction vessel is then placed in a vacuum drying oven heated to a temperature of about 110° C. for about fifteen hours. Subsequently, the vessel is sealed without exposing said alumina to the atmosphere and there are charged to said vessel 2.5 millimoles of vanadium oxytrichloride in 300 milliliters of isooctane. The vessel is then continuously stirred, and maintained at a temperature of about 105° C. for a period of about 10 hours. Subsequenlty, the extent of the reaction between the vanadium oxytrichloride and the alumina is determined by measuring the quantity of HCl removed from the vessel by the nitrogen stream, and by testing the liquid contents of the vessel for the absence therein of vanadium oxytrichloride and the said alumina is found to have 2.5 milliatoms of vanadium reacted on the surface thereof. 120 milliliters of this slurry containing about 1 milliatom of vanadium bound to the surface of about 2.2 grams of alumina, is then transferred from this reaction vessel to a second 500 milliliter vessel which has been previously flushed with dry nitrogen. Next, 2.5 millimoles of butyllithium is added to the said second vessel followed by 50 millimoles of methyl methacrylate monomer. Said second vessel is then continuously agitated at ambient temperatures for about 10 days. The reaction products are analyzed and it is found that about 3.5 grams of solid methyl methacrylate polymer has been produced.

When under the same conditions, butyllithium is utilized alone as the catalylst, i.e. in the absence of the cocatalyst, the polymer produced has a very low molecular weight as compared to the polymer produced in the presence of a catalyst comprising both components.

Example 5

To a 500 milliliter, three neck, glass reaction vessel there is added 5 grams of "Hi-Sil-X-303," a precipitated silica produced by Columbia Southern Chemical Corp. and which has an average particle diameter of about 23 millimicrons and a hydroxyl group content on the surface thereof of about 1.3 milliequivalents per gram. Said reaction vessel is then placed in a vacuum drying oven heated to a temperature of about 100° C. for about twelve hours. Subsequenlty, the vessel is sealed without exposing said silica to the atmosphere and there is charged to said vessel 4 millimoles of titanium tetrachloride and 400 milliliters of isooctane. The vessel is then continuously agitated and heated to, and maintained at the refluxing temperature of isooctane for a period of 3.5 hours. Subsequently, the extent of the reaction between the titanium tetrachloride and the silica is determined by measuring the quantity of HCl removed from the vessel by the nitrogen stream, and by testing the liquid contents of the vessel for the absence therein of titanium tetrachloride, and the said silica is found to have 4 millimoles of titanium chemically bound to the surface thereof. 1 gram of this silica containing about 0.8 millimole of titanium chemically bound to the surface thereof, and suspended in about 80 milliliters of isooctane is then transferred without exposure to the atmosphere from this reaction vessel to a second 500 milliliter, three neck, glass reaction vessel which has been previously flushed with dry nitrogen. 80 milliliters of isooctane and 200 grams of acrylonitrile are then charged to this second vessel. Next, 1.6 millimoles of triisobutylaluminum is added, and the contents of said second reaction vessel is continuously and vigorously stirred for about 17.5 hours. The reaction product is analyzed and it is found that about 9 grams of polyacrylonitrile has been produced.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated into the polymers.

Obviously many changes may be made in the above-described examples and procedure without departing from the scope of the invention. For example, although only transition metal chlorides are mentioned in the above examples, transition metal, bromides, iodides and fluorides are also suitable for the purposes of the present invention. For example, titanium tetrafluoride is entirely suitable.

Also pyrogenically coformed, or coprecipitated metal oxides, or metal oxides coformed with, or mixed with, other compounds are suitable for the purposes of the present invention. It is pointed out that it is intended and it should be understood that for the purposes of the present specification and the claims appended thereto, the term, metal oxide, includes silica.

Accordingly, it is intended that the above disclosure be regarded as illustrative and as in no way limiting the scope of the invention.

What we claim is:
1. A process for polymerizing acrylic monomers and mixtures thereof which comprises contacting at temperatures between about −80° C. and about 190° C., a substance conforming to the formula

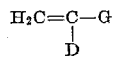

where D is chosen from the group consisting of any halogen, hydrogen, methyl, ethyl and propyl radicals; and G is a functional group chosen from the group consisting of —COOR″; —CONH$_2$; —CONHR″; —CONR″$_2$; —CHO; —C≡N; and —COR″; wherein each R″ is a hydrocarbon radical having a length of from one to eighteen carbon atoms, with a catalyst comprising
(a) a finely-divided inorganic solid having an average particle diameter of less than about 0.1 micron and carrying in chemical combination on the surface thereof at least about $1 \times 10^{-4}$ equivalents per gram of structures conforming to the formula $$TO_aX_b$$

wherein T is a metal chosen from the group consisting of the metals of Groups IVa, Va and VIa; O is oxygen; $a$ is a number from 0 to 2; each X is any halogen; $b$ is a number from 1 to 5; and where said structures are chemically linked directly from T to at least one oxygen atom in the surface of said solid; and
(b) an organometallic compound chosen from the group consisting of compounds conforming to the empirical formulae (1)   $MM'_vX_nR_{y-n}$ where M is chosen from the group consisting of the metals of Groups I, II and III; M′ is a metal of Group I; $v$ is a number from 0 to 1; each X is any halogen; $n$ is a number from 0 to 3; each R is chosen from the group consisting of any monovalent hydrocarbon radical and hydrogen; $y$ is a number from 1 to 4; and wherein $y-n$ is at least one; and (2)   

wherein each R′ is chosen from the group consisting of hydrocarbon radicals, alkoxy radicals, aryloxy radicals and the halogens; $p$ is a number from 0 to 3; each H is a hydride radical; $m$ is a number from 1 to 4; Si is silicon; and O is oxygen.

2. The process of claim 1 wherein said inorganic solid is a metal oxide.

3. The process of claim 1 wherein said inorganic solid is chosen from the group consisting of silica, alumina and mixtures thereof.

4. The process of claim 1 wherein each X in the formula $$TO_aX_b$$

is chlorine.

5. The process of claim 1 wherein said compound conforming to the formula $$TO_aX_b$$

is a compound of a metal of Group IVa.

6. The process of claim 1 wherein said compound conforming to the formula $$TO_aX_b$$

is zirconium tetrachloride.

7. The process of claim 1 wherein said compound conforming to the formula $$TO_aX_b$$

is titanium tetrachloride.

8. The process of claim 1 wherein said compound conforming to the formula $$TO_aX_b$$

is a compound of a metal of Group Va.

9. The process of claim 1 wherein said compound conforming to the formula $$TO_aX_b$$

is vanadium oxychloride.

10. The process of claim 1 wherein said compound conforming to the formula $$TO_aX_b$$

is vanadium tetrachloride.

11. The process of claim 1 wherein said compound conforming to the formula $$TO_aX_b$$

is a compound of a metal of Group VIa.

12. The process of claim 1 wherein the substance conforming to the formula

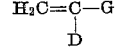

is methyl methacrylate.

13. The process of claim 1 wherein the substance conforming to the formula

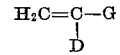

is isopropyl acrylate.

14. The process of claim 1 wherein the substance conforming to the formula

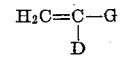

is acrylonitrile.

15. The process of claim 1 wherein said organometallic compound is an aluminum alkyl.

16. The process of claim 1 wherein said organometallic compound is a silane.

17. The process of claim 1 wherein said organometallic compound is a dialkylsilane.

References Cited by the Examiner

UNITED STATES PATENTS

| | | | |
|---|---|---|---|
| 2,912,419 | 11/1959 | Peters et al. | 260—93.7 |
| 2,919,266 | 12/1959 | Lauer | 260—93.7 |
| 2,924,628 | 2/1960 | Donaldson | 252—442 |
| 2,989,516 | 6/1961 | Schneider | 260—88.2 |
| 2,999,074 | 9/1961 | Bloch et al. | 252—442 |
| 3,008,949 | 11/1961 | Langer et al. | 260—94.9 |

(Other references on following page)

UNITED STATES PATENTS

| | | | |
|---|---|---|---|
| 3,054,754 | 9/1962 | Lasky | 252—429 |
| 3,166,542 | 1/1965 | Orzechowski et al. | 260—94.9 |
| 3,166,544 | 1/1965 | Orzechowski et al. | 260—94.9 |

FOREIGN PATENTS

| | | |
|---|---|---|
| 823,024 | 11/1959 | Great Britain. |
| 592,111 | 7/1959 | Italy. |

OTHER REFERENCES

Gaylord et al.: Linear and Stereoregular Addition Polymers, Interscience Publishers, Inc., New York (1959), page 106.

JOSEPH L. SCHOFER, *Primary Examiner.*

JAMES A. SEIDLECK, *Examiner.*

H. WONG, *Assistant Examiner.*